Patented May 4, 1926.

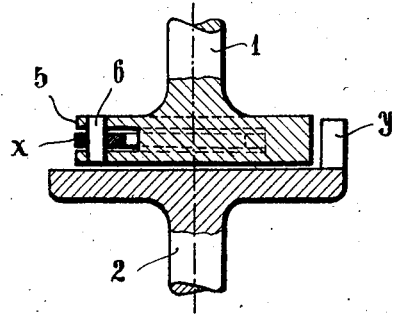
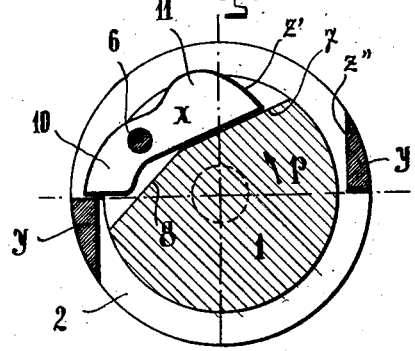
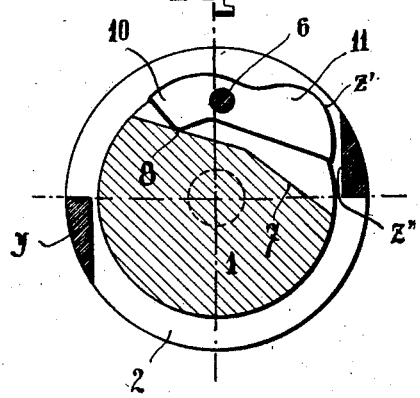

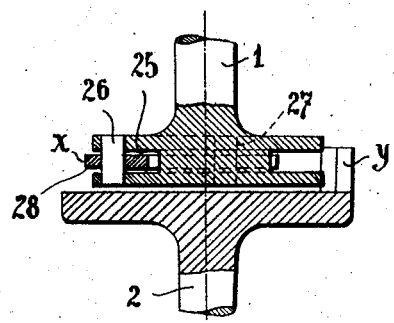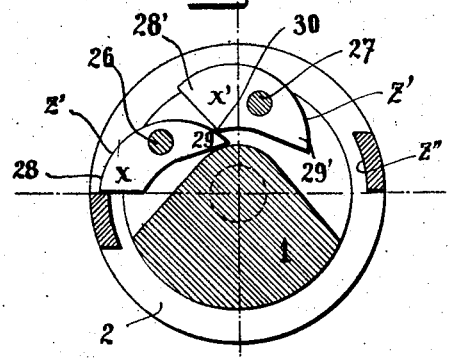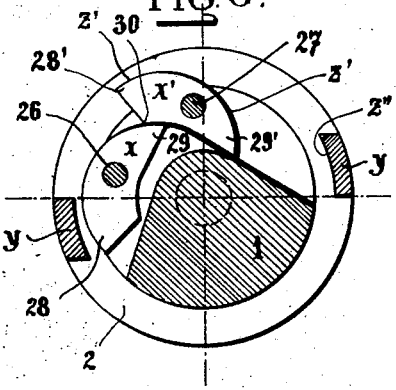

1,583,092

UNITED STATES PATENT OFFICE.

THEODOR PANTOFLIČEK, OF PILSEN, CZECHOSLOVAKIA.

FREE-WHEEL-COUPLING MECHANISM.

Application filed November 1, 1921. Serial No. 512,064.

*To all whom it may concern:*

Be it known that I, THEODOR PANTOFLIČEK, citizen of the Republic of Czechoslovakia, residing at Pilsen, Karlsbadergasse 24, Czechoslovak Republic, have invented certain new and useful Improvements in Free-Wheel-Coupling Mechanism (for which I have filed applications in Czechoslovakia, April 11, 1919, No. 409/19 and No. 2,737/20, April 9, 1920; Austria, No. 1,985, filed April 24, 1920, and No. 1,501, filed March 17, 1921; Great Britain, No. 9,608 and No. 9,609, filed March 31, 1921; Germany, No. 39,833, filed May 17, 1920, and No. 41,826, filed April 6, 1921; Switzerland, No. 11,679, filed March 21, 1921, and No. 11,896, filed March 26, 1921; Sweden, No. 1,170, filed March 24, 1921, and No. 1,387, filed March 30, 1921; France, No. 142,555, filed March 30, 1921, and No. 14,268, filed March 31, 1921), of which the following is a specification.

My invention relates to clutch mechanism of the type comprising two clutch members, one thereof being a driving member provided with pawls and the other being a driven member provided with ratchet teeth with which the pawls cooperate.

Various practical embodiments of the invention are illustrated on the accompanying drawing. Figs. 1–3 show one form of construction of the coupling in one vertical section and two horizontal sections, Fig. 2 showing the position of the coupling parts when engaged and Fig. 3 their position when disengaged. Figs. 4 to 6 show a second form of construction of couplings in accordance with this invention.

In all the constructions illustrated in the drawings 1 indicates one of the coupling parts (for example the driving part) 2 indicates the other coupling part (this is for example the driven part). $x$ indicates the pawls provided on the coupling part 1 and $y$ the ratchet teeth on the part 2 which cooperate with the pawls $x$.

The pawls $x$ and the ratchet teeth $y$ are provided with special controlling means $z'$, $z''$, which when the clutch is running free positively control the pawls of the part 1 so that these are always kept in the position ready to engage with the teeth $y$ of the coupling part 2. The controlling means of the pawls $x$ and the ratchet teeth $y$ can be in different forms; in the examples illustrated in the drawing they consist of controlling surfaces $z'$ $z''$ arranged upon the pawls and ratchet teeth.

In the construction illustrated in Figs. 1–3 one element of the clutch consists of a two armed pawl $x$ which is mounted to rock in a slot 5 of the disc shaped coupling part 1. 6 is the pivot of the pawl $x$; 7, 8 are the bottom surfaces of the slot 5 arranged at an obtuse angle to one another. The pivot 6 is located at one side of a radius projecting through the vertex of this obtuse angle and the pawl $x$ is mounted thereon so that the shorter arm of the pawl is on the side of slot 5 having the pivot. This arm of the pawl $x$ is formed as a locking piece 10. The other arm of the pawl $x$ forms a controlling body 11 which carries on its outer end the controlling surface $z'$.

The second coupling part 2 is likewise in the form of a disc which is provided at its edge with engaging teeth $y$. The engaging teeth are of a substantially tri-angular section and are so arranged upon the coupling part 2 that they embrace the coupling part 1 with room for play. $z''$ are controlling surfaces provided upon the engaging teeth $y$ and they effect in the manner described below the positive control of the pawl $x$.

Assuming that the coupling or clutch is in the position shown in Fig. 2 (working) and that the driving part 1 is turned in the direction of the arrow $p$, then the locking part 10 engages with one of the ratchet teeth $y$ and causes the part 2 of the clutch to be taken with it in the direction of the arrow $p$. When the clutch is running free (for example when the coupling part 1 is stationary) a ratchet tooth $y$ of the part 2 strikes against the pawl arm 10 and causes the pawl $x$ to turn about the pin 6 (compare the position of the pawl in Fig. 3). In this position the pawl arm 10 rests with its inner edge upon the bottom surface 8 of the slot 5, whilst the coupling part 11 extends with its controlling surface $z'$ out of the slot. Upon the further free rotation of the coupling part 2 a tooth $y$ strikes against the pawl arm 11. The controlling surfaces $z'$ $z''$ move one over the other and cause a rocking of the pawl arm into a position which when the clutch is thrown in for working guarantees the positive engagement of the parts 10 and y.

In the construction illustrated in Figs. 4–6 the coupling part 1 is provided with two pawls x, x' which are arranged in regard to one another so that the pawls are always alternately brought into engagement with one of the clutch teeth y each pawl being moved in its turn by the positively controlled other pawl. The pawls x, x' are in this construction two armed and are mounted in a slot 25 which is provided in the coupling part 1. 26, 27 are the pivots of the pawls, 28, 28' are the arms formed as locking parts and 29, 29' are the other arms of the pawls. z' are controlling surfaces formed upon the pawls x, x' which as will be described later co-operate with the controlling surfaces z'' of the clutch teeth. For transmitting the control movement from the pawl x to the pawl x' and vice versa the arm 28' of the pawl x' is provided with a corner 30 which co-operates with the end of the arm 29.

When the clutch is running free the controlling surface z' of the pawl which is momentarily in engagement strikes against the controlling surface z'' of the succeeding tooth and causes this pawl to rock. This rocking movement is positively transmitted to the other pawl by engagement of the arm 29 with the corner 30 and the latter arm or its locking part is brought into position ready to engage with the teeth y of the clutch part 2. This alternating action is repeated so long as the free running of the clutch is continued. When in the working position the locking part 28 or 28' of the pawls x, x' whichever may for the moment be within reach of the rotating clutch teeth y strikes against one of these clutch teeth whereby the coupling of the parts 1 and 2 is effected.

The ratchet clutch made in this manner works in the same manner as an ordinary feed wheel with pawl. It possesses however the great advantage that its pawl or pawls during free running are always maintained positively in the correct locking position, so that the power-releasing devices which have hitherto been found necessary in connection with ratchet clutches such as, for example, springs or weights are no longer required to effect the engagement of the pawls. This constitutes a very great technical improvement, as it is just these power-releasing devices (springs for example) of ratchet clutches as hitherto constructed that are the frequent cause of breakdowns, which as is well known, may have the most serious consequences.

The above described constructions can be altered without departing from the spirit of the invention and can if desired be combined with one another. Both the number of teeth as also the number of the pawls can be selected as desired. It is quite immaterial whether the pawls are arranged in the driving or the driven part of the clutch. The essential feature is that the clutch elements are provided with controlling means z', z'' which when the clutch runs free guarantee the positive guiding of the pawls into the ready position for engagement.

What I claim as my invention is:

1. In a clutch mechanism of the character described, the combination of a driving element having a channel in a plane perpendicular to the axis of said element, the bottom surface of said channel consisting of straight walls at an angle to each other, a driven element having projections in said plane in register with said channel, said driving element being provided with oscillating means mounted in said channel and arranged to be engaged at one end during free running movement with said projections to move the opposite end into the path of the projections, the movement of said means being limited by contact thereof with the bottom surface of said channel.

2. A clutch mechanism, as claimed in claim 1, in which said channel has an angular bottom surface, and in which the oscillating means comprises a pawl provided with two arms having the under edges composed of a straight portion and a projection at one end, the said under edges being adapted to be brought into contact with one or the other of the planes of said bottom surface, the upper edge of the pawl being provided with a cam surface at one end adapted to be engaged by said projections to rock the pawl, the opposite end of the upper edge of the pawl being provided with a nose portion capable of movement into and out of the path of said projections.

3. A clutch mechanism, as claimed in claim 1, in which said channel has an angular bottom wall composed of two surfaces disposed at an obtuse angle to each other.

4. A clutch mechanism, comprising a disc driving member provided with a slot disposed transversely of the axis of the clutch, the bottom surface of the slot being composed of surfaces which are disposed at an obtuse angle to one another, a pawl pivotally supported in said slot and having one or the other of its opposite ends adapted to be seated against one of the surfaces of the obtuse angles of the bottom surface, the pivot for the pawl being disposed at one side of a radius projecting through the vertex of the bottom surface and projected through the said pawl so as to arrange the shorter arm of the pawl on the side of the slot having the pivot, and a driven member adjacent said driving member and having axially projecting teeth disposed on diametrically opposite sides of the member and movable with the latter through a path coincident with that of the said pawl, the said teeth being provided with an abrupt surface directed away from the direction of rotation and a controlling surface inclined towards the periphery of the driven member in the direction of rotation to engage the longer end of the pawl to move the latter into contact with the bottom surface of the slot while the shorter arm of the pawl is moved into the path of the said teeth during free running of the said clutch.

In testimony whereof I affix my signature.

ING. THEODOR PANTOFLIČEK.